United States Patent [19]

Aslin et al.

[11] Patent Number: 4,943,919

[45] Date of Patent: Jul. 24, 1990

[54] CENTRAL MAINTENANCE COMPUTER SYSTEM AND FAULT DATA HANDLING METHOD

[75] Inventors: Matthew J. Aslin, Bothell; Gary J. Patton, Langley, both of Wash.

[73] Assignee: The Boeing Company, Seattle, Wash.

[21] Appl. No.: 260,985

[22] Filed: Oct. 17, 1988

[51] Int. Cl.[5] .............................................. G06F 15/20

[52] U.S. Cl. .......................... 364/424.03; 364/424.01; 340/945

[58] Field of Search ...................... 364/424.01, 424.06, 364/507, 550, 551.01, 424.03; 340/945; 371/11

[56] References Cited

U.S. PATENT DOCUMENTS

| | | | |
|---|---|---|---|
| 4,212,064 | 7/1980 | Forsythe et al. | 364/424.03 |
| 4,414,539 | 11/1983 | Armer | 340/507 |
| 4,590,550 | 5/1986 | Eilet et al. | 364/200 |
| 4,626,996 | 12/1986 | Arlott | 364/550 |
| 4,634,110 | 1/1987 | Julich et al. | 371/11 |
| 4,658,359 | 4/1987 | Palatucci et al. | 364/424.06 |
| 4,675,675 | 6/1987 | Corwin et al. | 340/945 |

*Primary Examiner*—Thomas G. Black

*Attorney, Agent, or Firm*—Christensen, O'Connor Johnson & Kindness

[57] ABSTRACT

The present invention is directed towards an onboard central maintenance computer system integrated into an aircraft system and a system for collecting and analyzing complete maintenance information. The central maintenance computer system (CMCS) collects, consolidates, and reports LRU faults data in order to aid flight crew and maintenance personnel in maintenance procedures. An aircraft system in which the CMCS is used includes a plurality of line replaceable units (LRU), a communication system through which the LRUs can transmit LRU fault data and receiver test initiation commands, and an operator interface device for receiving input commands, displaying data, and communicating with other systems. The central maintenance computer system includes a data transfer system, an input/output processor, a memory device, and a control processing system. During flight, the control processing system controls the collection of complete LRU fault data; generates an isolated fault from the LRU fault data; associates the isolated fault with one of the maintenance messages stored in the memory device; and causes the associated maintenance message to be stored as an active maintenance message in fault history.

18 Claims, 9 Drawing Sheets

| MSGNO | MESSAGE | LOGIC | POSSIBLE FDES | ATA | FLTPHS |
|---|---|---|---|---|---|
| 1. 71039 | ENG-1 TURB COOLING AIR/ VALVE/CONTROL VALVE/ WIRING FAIL | (A76A010.23 + A76E010.23) o 1503 | 73010700 | 72-24 | ALWAYS |
| 2. 71040 | ENG-1-PMA SOL GROUP HIGH SIDE SHORT (CH-A) | ((A76A010.24 o NOT.71232) o 1503) o 2TD | 73010500<br>73010700<br>73010600 | 73-21 | ALWAYS |
| 3. 71041 | ENG-1-ENGINE SOL GROUP HIGH SIDE SHORT (CH-A) | ((A76A010.25 o NOT.71233) o 1503) o 2TD | 73010700 | 73-21 | ALWAYS |
| 4. 71042 | ENG-1 AIRPLANE 28V DC POWER FAIL (CH-A) | ((A76A010.26 o NOT.71234) o 1503) o 2TD | 73010700 | 73-21 | ALWAYS |

FIG. 5.

CENTRAL MAINTENANCE COMPUTER SYSTEM AND FAULT DATA HANDLING METHOD

TECHNICAL FIELD

The present invention relates to computerized maintenance data collection and analysis and, in particular, to a centralized maintenance computer system for use in overall aircraft system maintenance procedures and a method of collecting and analyzing a complete set of aircraft maintenance information.

BACKGROUND OF THE INVENTION

The use of digital computers within commercial aircraft systems has expanded the scope of automated maintenance-related monitoring and testing, and has improved the procedures for fault isolation. Fault isolation refers to the maintenance procedure for determining, from crew observations and/or testing, components that require replacement or repair. Maintenance procedures include the isolation of faults as well as the determination of the significance of a fault for maintenance scheduling. The traditional practice of fault isolation is based on flight crew observations and maintenance personnel analysis using maintenance manuals and operator initiated testing. This practice is highly dependent upon crew observation, memory and analysis, and on the timely transfer of data to the maintenance personnel.

It is customary to categorize aircraft maintenance activities into unscheduled and scheduled maintenance. Unscheduled maintenance is performed as required to maintain the aircraft's airworthiness during intervals between scheduled maintenance. Unscheduled maintenance is usually performed while the aircraft is on the ground between flights, although longer periods of time may be required, often resulting in schedule disruptions. Minimum ground time between flights is desirable to maximize airplane utilization; therefore, the time allocated is often limited to that required to refuel and service the aircraft, typically 20 to 120 minutes. Ground crews, therefore, need complete and accurate information regarding any repairs that will be required. The information must be made available as soon as possible to allow for preplanning of activities. The information must be precise so that a minimum amount of time is spent troubleshooting while the aircraft is on the ground in order to find the source of a problem.

Scheduled maintenance is comprised of specific tests, inspections, and repairs that are performed at predetermined intervals. These events are scheduled in advance and therefore rarely result in aircraft schedule interruptions.

To facilitate both scheduled and unscheduled maintenance, most aircraft systems are made up in part of components that can be removed and replaced quickly. These components are called Line Replaceable Units (LRUs). An LRU may be mechanical, such as a valve or pump; electrical, such as a switch or relay; or electronic, such as an autopilot or an inertial reference computer.

In the latest generation of aircraft, most electronic LRUs are actually digital computers. These computers are responsible for the control and monitoring of nearly all the various aircraft systems. The use of digital computers makes possible a degree of fault monitoring and semiautomatic system testing that was not previously possible. This fault monitoring and semiautomatic system testing is commonly referred to as Built in Test Equipment (BITE).

Other aircraft systems do not rely on BITE but may be monitored and tested in other ways, often through a scheduled maintenance task. An example of this is an anti-ice system that is controlled by a simple switch/relay network. Still other systems are not monitore electronically in any way. These are referred to as "nonmonitored systems". These systems rely on scheduled inspection or testing to determine maintenance requirements. Examples of nonmonitored systems are interior components such as seats or the aircraft structure itself.

BITE is software and hardware integrated into a computerized control system. The BITE is programmed to monitor the connected or attached LRUs as well as the control system itself. BITE diagnostics programs are run periodically either interactively or automatically to detect faults and to generate messages indicative of operating conditions. Generally, specific words or bits of words are set to communicate operating conditions. The testing and fault analysis performed by BITE may be initiated independently of operation of other LRUs and aircraft components.

In a monitored non-BITE system, no computerized control system including BITE is directly connected to the LRU. These LRUs are generally made up of a series of valves, lines, switches. etc. The LRU has certain operational characteristics that are monitored and tested for maintenance purposes by tapping into the system's discrete wiring. The characteristics that are monitored and tested include open/closed circuitry, voltage level, etc. This type of data is referred to as analog discrete data to distinguish it from the digital discrete and analog data generated by BITE.

The LRU in a non-BITE system is generally tested by maintenance personnel who utilize physical measurement testing devices to ascertain the state of the LRU. This maintenance information related to the LRU is not collected on a continuous basis. If a fault occurs in the LRU, the fault is usually observed by a flight crew member or maintenance personnel or is indicated during standard testing. If a fault is observed, then it is identified by utilizing manual test equipment and a maintenance manual. These procedures are extremely time consuming, depend upon observations and regular testing, and require the participation of experienced operators.

A main goal of aircraft maintenance procedures is to identify and correct LRU faults by monitoring their operation in flight and analyzing the flight data in order to isolate the LRU fault. The fault isolation procedure requires the consolidation of fault data in order to screen out faults that are reported by multiple LRUs and to reduce the fault indication down to the fault source, i.e., a specific component, LRU, or computerized control system. Automated or standardized methods of consolidation have been developed to aid maintenance personnel. Otherwise, the maintenance personnel would be required to consider each piece of data generated during flight. In order to facilitate aircraft maintenance procedures, it is desirable to automatically monitor a complete set of LRUs in flight, to accurately and quickly identify specific LRU faults from data obtained during the flight and from minimal additional testing, and to test replaced or repaired units.

As the number of aircraft systems that make use of digital computers with BITE has grown, so has the volume of maintenance information and the number of different ways the information is presented. The volume and presentation make it difficult for ground crews to obtain the specific information they need to effect the required repairs—hence, the need for a system that will collect and consolidate all of this information.

A number of maintenance systems have been developed that attempt to meet these maintenance procedure goals. Many of the systems are based on a centralized scheme for fault data collection and analysis. In these centralized systems, LRU data from multiple LRUs is automatically collected during flight or at the end of the flight and analyzed by the maintenance personnel. Some systems also provide automated fault isolation procedures. Some of the major drawbacks of the previous centralized systems include: lack of uniformity in the centralized system and LRU fault reporting schemes; lack of an overall aircraft view for isolating faults; and inability to collect information from a complete set of LRUs. For these reasons, many maintenance systems still require extensive operator observation and intervention for fault isolation. This reliance on flight crew and maintenance personnel can result in time consuming and inaccurate maintenance procedures.

Centralized maintenance systems generally include data collection, data processing, data display, and operator command input components. In one type of system, prior to the inclusion of separate BITE in computerized control systems, a centralized BITE scheme was used wherein fault information related to an LRU was encoded by the LRU itself and transmitted over a serial data bus to a central control system. A number of LRUs were connected to the central control system. The central control system received and presented the fault data to the operator in much the same format as it was transmitted by each LRU. Thus, to understand the data transmitted from various LRUs, the operator was required to be familiar with the message format and operation of each LRU. The main task of the central control system was to display the individual LRU fault data. Fault isolation procedures were generally not feasible because of the nonuniform formats of the data. This scheme is still used by many aircraft systems to collect and report information for groups of related LRUs.

In these centralized BITE schemes, the fault data received at a central control system might be prioritized and displayed during flight in the form of flight crew observations. Faults may be prioritized by whether crew awareness or action is required. The observations appear as indications on a dedicated display such as the primary flight display. In some aircraft systems, it is the flight crew's responsibility to record the observations along with other operating parameters such as time of occurrence. These observations and operating parameters are then passed on to the maintenance personnel upon landing. Generally, a series of further automated or manual fault isolation tests must be performed in order to locate the fault. This type of maintenance system relies heavily on the accuracy of the flight crew observations. If an observation is missed or is incorrect then the isolation of a fault may be extremely time consuming or may not be possible from the information provided. Additionally, since not all faults are observed and/or recorded, much LRU flight data is not available to the maintenance personnel.

Alternatively, the central control system stores the LRU fault data generated during a flight. The data may be obtained from the LRUs continuously in flight or may be gathered at the end of each flight and transmitted to the maintenance personnel. The central control system may additionally correlate the observations or faults with operating parameters such as time of occurrence. In this system, although a great deal of LRU data may be provided to the maintenance personnel, the data may be of little help because it may be made up of cryptic notations, It may include nonfault or irrelevant information, and, because there may be no uniformity of format, the data as reported may not be suitable for analysis by automated means.

With the provision of a variety of computerized control systems in the overall aircraft system, BITE has been included directly in the control system computers. Thus, a centralized control system may receive LRU data from BITE rather than each LRU. Problems of crew understanding and data manipulation still exist because of the nonuniformity of data collected from BITE. Certain steps have been taken for making BITE test initiation commands and test result formats uniform to aid in inter-control system communications. For example, ASCII characters in an Aeronautical Radio Inc. (ARINC) 429 format are widely provided by BITE systems. This format produces English type messages.

A distributed or a federated BITE system is a central control system responsible for a series of computerized control systems which each include BITE. The distributed BITE system may include a central computer that acts as a passthrough device to collect and display the English type messages generated by each BITE. Further, the display system may provide means for operator initiated testing of specific systems by accepting a test initiation command and forwarding the command to the BITE. The test results are received from the BITE and passed through to the operator. One drawback of the distributed BITE system is that the operator is still required to have an understanding of characteristics of specific BITE in formatting the test initiation commands and analyzing the test results. Because the message formats are BITE specific, it is difficult to automatically analyze a message in conjunction with messages received from independent BITE in order to isolate faults. The English-type messages are meant to be directly observed and understood by flight crew and maintenance personnel rather than automatically combined with other messages to produce an isolated fault message. Additionally, some control systems generate coded messages wherein each message is a series of symbols that correspond to a message in a maintenance manual. Thus, in order to utilize the message provided by the central control system, the operator must have access to maintenance manuals or a keen knowledge of the specific system.

The nonuniformity of fault data formats generated by BITE reduces the utility of collecting the in flight fault data for an entire aircraft system in a centralized system. Since the maintenance personnel cannot manipulate the fault data because of the nonuniformity, there is no reason to retain in flight data in excess of the observation reported to the flight crew and a small number of fault data indications that are considered to be of high priority.

Some central-type control systems monitor a set of computerized control systems that are related to a specific aircraft function. For example, a central-type control system may monitor only BITE related to autopilot and flight director functions. The identified BITE can then be customized to produce uniform messages. By requiring uniform messages to be generated by each BITE and having an understanding of the operation of the limited systems being monitored, some fault isolation may be performed by the central-type control system. In many instances, only selected fault data that is deemed necessary to carry out the specific function is transmitted from the BITE to the central-type control system. This limited data collection is based on limitations in data storage, hardware connections, etc. Additionally, the fault isolation procedure is generally limited to generating system or LRU level fault reports. This is the case since further analysis, i.e., to generate shop faults, requires a great deal of information about the system components' interconnection and fault status.

One of the early applications of digital computers with BITE was the autoflight system for The Boeing Company's 757 and 767 aircraft. The autoflight system is made up of multiple digital computers connected to various sensors and actuators. The computers monitor themselves, the sensors and actuators, and the other computers and report the results to a single maintenance control and display panel (MCDP) computer. This computer performs additional fault isolation if necessary and presents this information as messages to the ground crew indicating which specific LRU or interfaces between LRUs have failed. The computer also indicates what, if anything, the flight crew observed as a result of the fault. The MCDP computer also allows the ground crew to initiate a set of semiautomatic tests covering various parts of the autoflight system. These tests help further isolate problems as well as allowing the verification of proper LRU installation following a replacement. The autoflight system monitors a limited set of information. Only the flight control, thrust management, and flight management computers are connected to the MCDP computer. Additionally, only certain predetermined faults are recorded by the MCDP computer. Finally, only limited data analysis is performed by the MCDP computer. The analysis is generally meant to reconcile conflicting fault messages received from the monitored computers. Otherwise, the fault analysis is done separately by each monitored computer.

The central control systems described above generally suffer from the lack of ability to provide maintenance data consolidation and aircraft-wide fault isolation. Even if all of the BITE information is in a uniform format, i.e., an English-type format, the messages are not easily combinable to facilitate fault analysis. There is the additional consideration that not all LRUs are associated with BITE. Therefore, a complete set of LRU fault data is a superset of the BITE fault data. A centralized fault handling system for analyzing a complete set of LRU fault data requires that the data to be in a uniform combinable format and that there be a thorough understanding of the overall aircraft system interconnections and operation.

The present invention overcomes these and other problems in the prior art.

SUMMARY OF THE INVENTION

The present invention is directed towards an onboard central maintenance computer system integrated into an aircraft system and a method for collecting and analyzing a complete set of aircraft maintenance information. The central maintenance computer system (CMCS) collects, consolidates, and reports LRU fault data in order to aid flight crew and maintenance personnel in maintenance procedures. The central maintenance computer system includes a data transfer system, an input/output processor, a memory device, and a control processing system. An aircraft system in which the CMCS is used includes a plurality of line replaceable units (LRU), a communication system through which the LRUs can transmit LRU fault data and receive test initiation commands, and an operator interface device. The operator interface device includes a display device such as a terminal screen for displaying maintenance information, an input device such as a keyboard for receiving input commands, and an interface communication system for transmitting the input commands and for receiving the maintenance information from the aircraft system.

The data transfer system of the CMCS is connected to each of the other CMCS components and is used for transferring data therebetween. The input/output processor is coupled to the interface communication system and the communication system for receiving and transmitting data. In this manner, data and commands from the aircraft system are received by and transmitted from the CMCS. The CMCS memory device stores data including preestablished maintenance messages corresponding to isolated LRU faults.

The control processing system includes a series of program modules that are executed by the CMCS and control the transfer and manipulation of data within the CMCS between the CMCS and the remainder of the aircraft system. The control processing system includes a main control program including a data collection module, a fault consolidation module, and an output module. The data collection module controls the input/output processor, causing it to collect the LRU fault data via the communication system. The consolidation module generates an isolated fault from the LRU fault data by screening out cascaded faults and consolidating multiple faults, associates the isolated fault with one of the maintenance messages stored in the memory device, and causes the associated maintenance message to be stored as an active maintenance message. The output module, in response to an input command indicative of a display request received from the operator input device, causes the active maintenance message to be transmitted as maintenance information to the interface communication system. The maintenance message is then presented by the operator interface device for analysis by flight crew or maintenance personnel.

In accordance with additional aspects of the present invention, each of the preestablished maintenance messages is stored in the memory device in association with a combinatory logic phrase. The logic phrase is indicative of the various LRU states and other operating parameters that must be true in order for the maintenance message to be true. The collection module of the control processing system causes the input/output processor to collect data indicative of the operating parameters. The consolidation module then matches the LRU fault data and operating parameters with the combinatory logic phrases associated with the stored maintenance messages. If a match is found, the associated maintenance message is considered to be an active message. If a match is not found, the associated maintenance message is considered to be inactive.

In accordance with further aspects of the present invention, certain LRUs in the aircraft system, referred to as controlled LRUs, are associated with a monitoring and testing system, such as a computerized control system. The aircraft system also includes a fault collection device in the communication system that is connected to the monitoring system. The fault collection device receives LRU fault data from the monitoring system. The control processing system includes an indirect module for causing LRU fault data to be transmitted from the fault collection device to the input/output processor. The control processing system also includes a direct module for causing LRU fault data to be transmitted directly from noncontrolled LRUs to the input/output processor. In this manner, data from all aircraft system LRUs is collected by the CMCS. Additionally, the CMCS includes a fault collection control module in the fault collection device for selecting which LRU fault data is received and transmitted by the fault collection device and transmitted to the input/output processor.

In accordance with other aspects of the present invention, the fault collection device generates a flight deck effect indicative of an LRU fault. The indirect module further causes the flight deck effect to be transmitted from the fault collection device to the input/output processor. The control processing system includes a correlation module for correlating the flight deck effect with one of the active maintenance messages. The correlated flight deck effect is stored in the memory device in association with the active maintenance message. The output module then causes the correlated flight deck effect and maintenance message to be transmitted to the interface communication system as the maintenance information. In this manner, the operator is provided with maintenance information generated by the CMCS as well as fault information generated by other aircraft systems.

In accordance with additional aspects of the present invention, the input/output processor receives an input monitoring command related to a specific LRU. In response thereto, the output module causes the LRU fault data for the specified LRU to be continuously received by said input/output processors, to be formatted in a predetermined format, and to be transmitted to the interface communication system, whereby the LRU status can be interactively monitored via the operator interface device.

In accordance with still further aspects of the present invention, the CMCS receives a test initiation command from the operator interface device and transmits the test initiation command to the specified LRUs via the communication system. In response to a test complete indication received from the LRU, the CMCS determines the test result and transmits the result to the operator interface device. In addition, the CMCS includes an ATE connector, thereby allowing ATE access to LRUs coupled to the CMCS.

BRIEF DESCRIPTION OF THE DRAWINGS

FIG. 5 is a chart that depicts samples of entries in a maintenance message data base used in the fault consolidation procedures of the present invention;

DETAILED DESCRIPTION OF THE PREFERRED EMBODIMENTS

Figure 1:
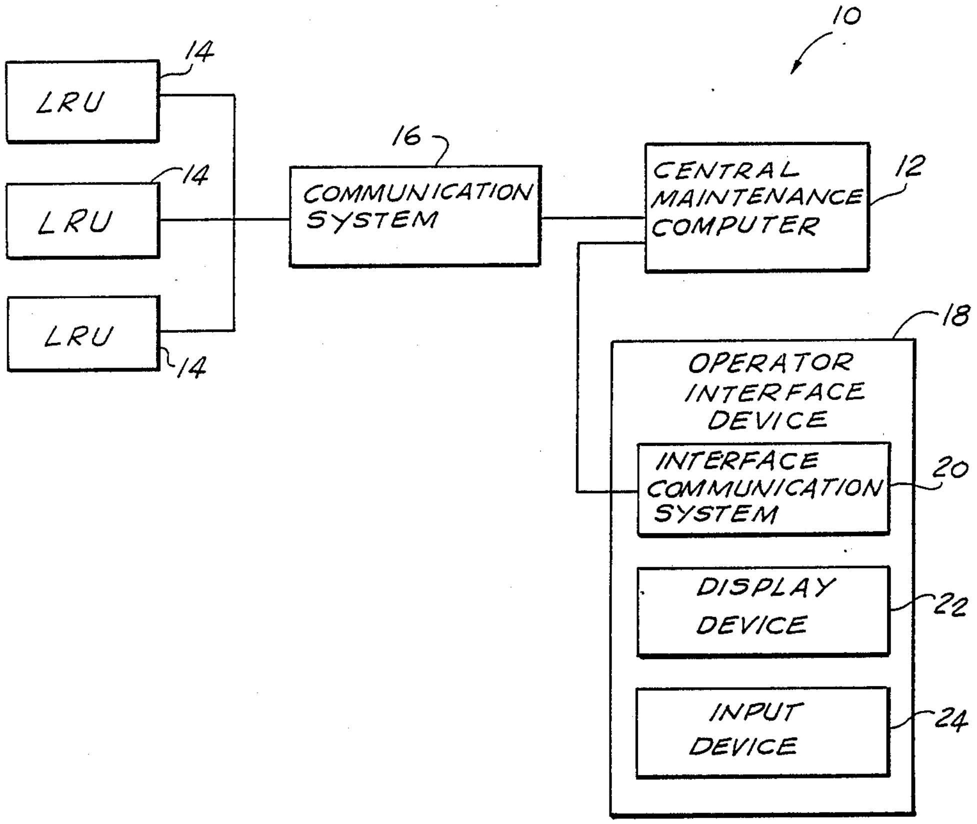
FIG. 1 is a block diagram of an aircraft system into which the central maintenance computer system of the present invention is integrated.

With reference to FIG. 1, aircraft system 10 into which the central maintenance control system (CMCS) of the present invention is incorporated includes a central maintenance computer (CMC) 12, line replaceable units (LRU) 14, a communication system 16, and an operator interface device 18. The CMC includes data processing, transfer, and storage means. The operator interface device preferably includes an interface communication system 20, a display device 22, and an input device 24. The CMC is coupled to the LRUs 14 by the communication system 16. The CMC is coupled to the operator interface device 18 by an interface communication system 20. It is to be understood that the aircraft system includes numerous other components not shown.

The data transfer protocol between the aircraft system components is preferably performed according to ARINC 429, which is one of the standard protocols used in aircraft systems. The methods of transferring data onto and off of data buses or from specific component parts requires the provision of certain identification parameters formatted in a digital word. The typical format for an ARINC 429 word is a 32-bit word comprising an octal label filed in bits 1–8, data fields in bits 9–29, a sign/status matrix (SSM) field in bits 30–31, and a parity field in bit 32. One bit in the word is indicative of the status of the LRU to which the word is related. Analog data may be converted into digital data and packed into similarly formatted digital words. The ARINC 429 protocol is generally known and the present invention assumes data transfer is carried out according to that protocol, or another suitable protocol or combination of protocols.

Each LRU 14 constitutes a replaceable component. Digital, analog and analog discrete LRU fault data are generated by LRUs 14 continuously during flight and other periods of CMS power up. The LRU fault data is transmitted to the CMC 12 via the communication system 16. The fault data is processed by the CMC control program (discussed below) which: generates active maintenance messages related to isolated LRU faults; correlates active maintenance messages to other LRU fault messages generated in the aircraft system; formats the fault information for operator usage; and processes LRU tests. Preferably, the CMC continuously receives and processes fault data received from the communication system during flight. Other aircraft system operating parameters such as time, flight number, etc., are collected via the communication system or self-generated by the CMC. This fault data and operating parameter collection is done in cycles, e.g., 1 cycle per second. The remainder of the CMC control program functions are executed in response to input commands received from the operator interface device 18.

Maintenance messages are transmitted to the operator interface device 18 in response to an "input display" request received and processed by the CMC 12. In response to a test initiation command received from the operator interface device 18, the CMC 12 generates a "test initiation" command and transmits the command to the LRU 14 of interest via the communication system 16. Once the test is completed, the CMC processes the test results and transmits the results to the operator interface device for display. In response to an LRU "input monitoring" command received from the operator interface device 18, the CMC 12 acts as a pass-through device and passes the fault data related to the specified LRU 14 directly to the operator interface device for interactive viewing.

Most aircraft LRUs are connectable to the communication system 16. Thus, a complete set of LRU fault data, also referred to as monitor data, is collected and processed by the CMCS of the present invention. Because a complete set of LRU fault data is available for processing, the fault isolation process carried out by the CMC is very thorough. The maintenance messages provided by the CMCS correspond to system level, LRU level, and component level faults. The communication system 16 is a means of communicating any type of information to and from the CMC and the aircraft LRUs. This information may be in a variety of forms. For example, analog signals (variable voltage, current, and frequency), discrete wire status (open or ground), and serial digital data (per ARINC 429) may be processed by the communication system. Processing of other forms of communication, such as radio signaling, may also be incorporated into the communication system 16.

Figure 2:
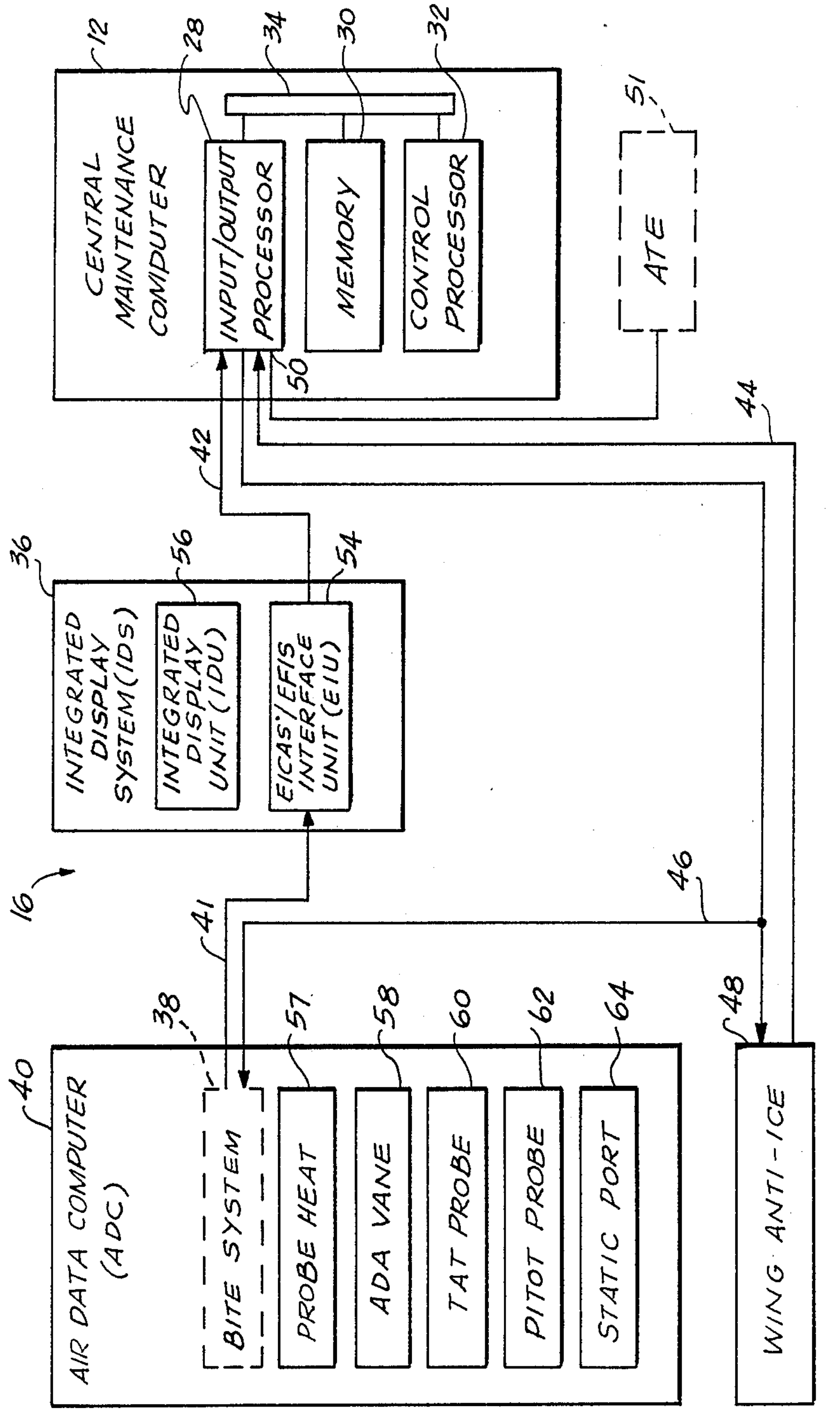
FIG. 2 is a detailed block diagram of a portion of the aircraft system illustrated in FIG. 1 including a set of LRUs and the central maintenance computer of the present invention.

With reference to FIG. 2, in one preferred embodiment, the CMC 12 includes an input/output processor 28, a memory 30, a control processor 32, and a data transfer system 34. The communication system 16 includes a portion of an aircraft system integrated display system (IDS) 36 and built in test equipment (BITE) 38 associated with computerized control system 40. An example of such a control system is the air data computer (ADC). The ADC 40 is connected to the IDS 36 by data bus 41. The communication system 16 also includes an indirect data bus 42, a direct data bus 44 and a test initiation data bus 46. The indirect data bus 42 couples the CMC 12 to the IDS 36 so that the CMC receives ADC fault data. The direct data bus 44 couples the CMC directly to non-BITE LRUs, such as the wing anti-ice LRU 48, through aircraft discrete wiring so that the CMC receives fault data therefrom. Finally, the test initiation data bus 46 couples the CMC to each LRU directly or through a BITE system so that the CMC can transmit test initiation commands to the LRUs. Each of the data transfer buses is preferably a unidirectional data bus. However, it is to be understood that a set of bidirection data buses serving the same purpose as the unidirectional data buses can be used, if desired.

In the CMC, the data transfer system 34 is coupled to each of the other CMC components and carries the data transmitted between all of the components. The input/output processor 28 is coupled to the indirect data bus 42, the direct data bus 44, and the test initiation data bus 46. Each data bus is connected to one or more input/output ports on the input/output processor. The CMC may also include an automated test equipment (ATE) connection 50 located on the CMC front panel and coupled to the input/output device for coupling the CMC to ATE 51 (shown in reference).

The memory 30 preferably includes a segment of nonvolatile memory (NVM) in which active maintenance messages and FDEs are stored. This memory is referred to as the fault history data base. Additional memory is required for storing the CMC control programs, the maintenance message data base, and additional data bases, and for program execution.

The CMC component specifications are dependent in part upon the aircraft system into which the CMCS is integrated. For example, in an aircraft system that may be suitable for an aircraft such as the Model 747-400 produced by the Boeing Company, Seattle, WA, the CMC may be an 8 MCU computer. The CMC includes two dedicated input/output processors, and three application processors. Blocks of random access memory (RAM), electrically erasable programmable read only memory (EEPROM), and ultraviolet programmable read only memory (UVPROM) are associated with each processor. In general terms, the CMC interfaces, i.e., the input/output device, must be compatible with the communication system 16 and the interface communication system 20. Preferably, the memory is adequate to hold the maintenance message data base, as well as the fault history. In one actual embodiment, the maintenance message data base contains 6,500 messages. Also, preferably, the processors are capable of continuously collecting fault information from the communication system. In one actual embodiment, the communication system is connected to 65 monitored LRU systems, and the collection cycle is performed once every second.

Although a single CMC is described, in practice, a pair of identical left and right CMCs would be included in the CMCS. The duplicate CMCs provide redundancy that ensures continuity of operation in case of failure of one of the CMCs. Additionally, data validation comparisons are performed between the two computers. Both CMCs are powered in normal operation and both simultaneously process fault data. All inputs to the CMCs are connected in parallel to both computers by duplicate data buses. Digital output buses are switched by relays contained within one CMC, e.g., the left CMC. This simultaneous processing is facilitated by cross-talk between the two, so that only one CMC is outputting digital information at any given time. For example, in normal operation, digital output information is provided to the aircraft system by the left CMC. Upon failure of the left CMC, as indicated by the state of a left CMC BITE data bit, the outputs are automatically switched so that the right CMC is providing the output. The remainder of the description includes references to a single CMC.

The IDS 36 includes an EICAS/EFIS interface unit (EIU) 54, and an integrated display unit (IDU) 56. The IDS collects and processes fault data from computerized control systems 40 connected to the engine indicating and crew alerting system (EICAS) and the electronic flight instrument system (EFIS). The EICAS provides primary caution, warning, and status condition display indications to the flight crew. The EFIS provides the primary navigation data display including attitude, altitude, course, etc. Generally, a series of EIUs will be included in the IDS. In such a case, each EIU is identified by a position such as left, right, or center. For the present description a single EIU will be referenced.

The IDU 56 is a flight deck display panel that includes dedicated displays for information such as primary flight, navigation, EICAS messages, etc. Additionally, a series of control display units (CDU) are included. The CDUs are used as backup input/output units for the dedicated display units. The dedicated displays are used by the IDS to annunciate system observations to the flight crew. The CDU are utilized by the flight crew as input/output devices for the flight management system.

The type of LRU fault data collected at the IDS, referred to as IDS data, is data indicative of situations that require crew awareness, i.e., flight deck annunciation, or that affect dispatchability. This data is generally generated by BITE, e.g., BITE 38, integrated into a computer control system 40 that is associated with various LRUs. The EIU contains and executes a control program for causing specific data to be transferred from the LRUs to the IDU.

The EIU is programmed for the CMCS to collect data that is generally not monitored for the IDS but is also indicative of LRU states. This data is collected by the EIU through existing EIU computerized control system interfaces. In this matter, no hardware interfaces are duplicated for the present invention. A fault collection control module, discussed below, is executed by the EIU control program to cause the device to perform the required additional data collection.

The data collected at the EIU 54 is digital discrete and analog data indicative of LRU faults and operation. When the digital data is transmitted from the LRUs, it is generally transmitted in a uniform format. This reflects the industries' attempt to standardize BITE reporting to enhance inter-BITE communications among other benefits. However, certain reporting exceptions exist and are dealt with by the EIU control program.

BITE is integrated into a computerized control system including dedicated hardware and a software program. The software program includes both in-flight and ground portions. The in-flight portion collects and stores fault data detected during aircraft operation. The ground portion provides an interface means for maintenance personnel to retrieve fault data histories, and to initiate test sequences for fault isolation and confidence checks.

An example of BITE 38 is the BITE of the air data computer (ADC). The BITE hardware and software in the ADC monitors the health of the ADC itself and its associated LRU sensors and interfaces. Some of the LRUs associated with the ADC are the probe heat 57, AOA vane 58, TAT probe 60, PITOT probe 62, and static port 64. The ADC generates "air data" which is data such as airspeed, vane angle, etc., and "maintenance data" such as probe heat fail, static port fail, etc. If a fault in the ADC or an associated LRU is detected, the ADC reports the fault in both air data and a maintenance data words. For example, if an airspeed failure occurs, the BITE will invalidate its airspeed output word and set a bit in a maintenance word to indicate what the specific fault is. Each of these words is transmitted to the EIU 54. The EIU, in turn, is programmed to forward the airspeed word to the IDU which annunciates the fault to the flight crew as a flight crew observation displayed on one of the dedicated displays. In the present invention, the EIU additionally forwards the maintenance word to the CMC. For each computerized control system monitored by the IDS, a similar fault reporting procedure occurs.

In addition to annunciating fault information to the flight crew using the IDU, the IDS generates flight deck effects from the fault data. The IDS processes the output word received from the ADC BITE, e.g., the airspeed output word described above, which results in the blanking of the display for airspeed in the IDU. The IDS also creates an EICAS message, referred to as a flight deck effect (FDE), that is an indication of the observation and the actual fault that is contained in the maintenance word. The flight deck effects are presented to the flight crew through the IDU when crew awareness is required or dispatchability is affected. These are generally presented in a coded format or a brief English-type format. The limited capacity of the IDU makes it necessary for the IDS to prioritize faults and observations. Therefore, not all fault information is annunciated to the flight crew via the IDU. At the same time, in addition to forwarding the maintenance word to the CMC, the EIU sets a bit on a word that is transmitted to the CMC to indicate that the parameter for the observation, i.e., airspeed, has been blanked and an FDE has been created.

The direct data bus 44 couples the CMC 12 directly to other monitored LRUs, that are not generally monitored by the IDS. As an example, the CMC receives fault data from the wing anti-ice LRU. Most of the fault data collected in this manner is in an analog discrete format. The fault data format is referred to as analog discrete because the signals received are indicative of characteristics such as switch position, valve position, voltage level, etc. The values of the analog discrete signals can be mapped to binary values, e.g., 1 indicates a closed switch and 0 indicates an open switch, and packed into digital words. Under the control of the CMC control program, the CMC periodically monitors these LRUs and/or initiates a test of the LRUs using a discrete signal. The analog discrete fault data is analyzed by the CMC in the same manner as the digital fault data collected from the EIU.

Figure 3:
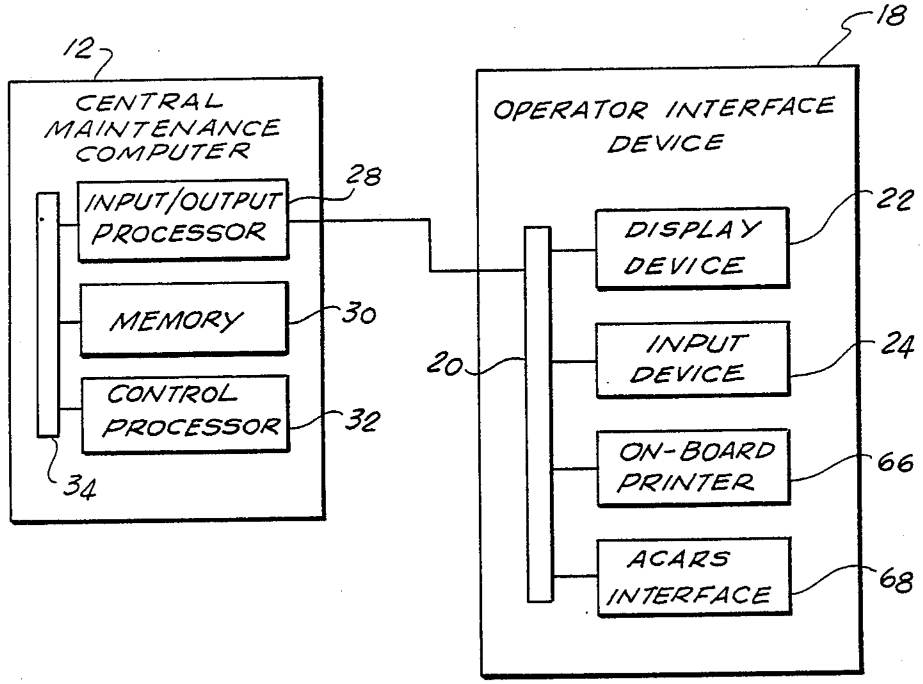
FIG. 3 is a detailed block diagram of a portion of the aircraft system illustrated in FIG. 1 including an operator display device.

With reference to FIG. 3, in a preferred embodiment including CMC 12 as described above, the operator, generally either a member of the flight crew or maintenance personnel, is provided maintenance information generated by the CMC via the operator interface device 18. The operator interface device includes a display device 22, an input device 24, an interface communication system 20, and, optionally, an onboard printer 66 and an ARINC communications addressing and reporting system (ACARS) interface 68. The connection between the CMC and the operator interface device allows an operator to retrieve and view stored maintenance information, to interactively monitor LRU input, and to carry out LRU test procedures.

Figure 4:
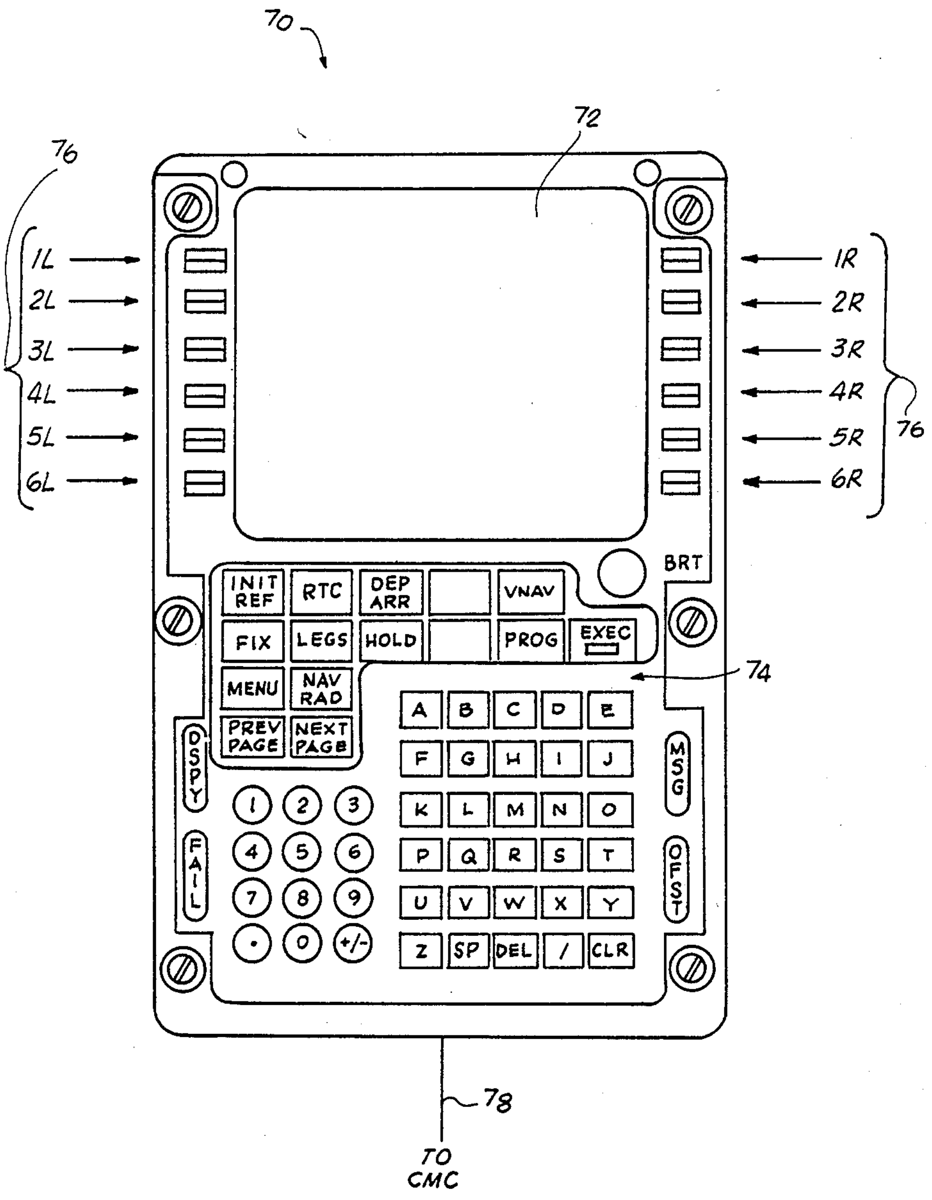
FIG. 4 is a schematic diagram showing the format of a multipurpose control display unit suitable for use as the operator interface device in the present invention.

With reference to FIG. 4, a multipurpose control display unit (MCDU) 70 is the main operator interface with the CMCS. The MCDU 70 is mounted on the flight deck on or adjacent the IDU. The MCDU includes a display screen 72, keyboard 74, line select keys 76, and input/output bus 78. In one actual embodiment of the invention, the display screen generally provides 14 lines of 24 characters each. The control circuitry of the MCDU (not shown) may be of generally conventional design, and include a symbol generator, refresh circuitry for the display screen, and means for controlling the display screen in response to the receipt of predefined control codes such as carriage return and horizontal tab. The display screen, keyboard and line select keys, and input/output bus and internal circuitry correspond to the display device 22, input device 24, and interface communication system 20, respectively, as shown in FIGS. 1 and 3.

The MCDU 70 utilized in one actual embodiment of the present invention is a part of the flight management system (FMS). The FMS MCDU provides the operator interface for both the FMS and the CMCS. The operator selects the FMS or the CMCS menu through a main MCDU menu. In this manner, the operator interface device need not be duplicated and no additional flight deck space is required to accommodate the CMCS. MCDUs from other control systems could also be used by coupling their interface communication systems to the input/output processor 28 of the CMC 12. A host system for sharing an MCDU should be chosen with consideration given to the relative use of the MCDU by the host system and the CMCS. Multiple operators may access the CMCS by mounting multiple MCDUs on the flight deck and, as well, in the aircraft electronics bay. The control of the MCDU operation is carried out by both the MCDU internal circuitry and the CMC control program. Use priorities can be programmed into each to control conflicting use requests.

Additionally, the CMC is connected to an onboard printer 66 through the operator interface device 18. The printer allows the flight crew to print out reports of selected CMCS data. The printed reports generally correspond to display pages generated by the CMC control program.

If an ACARS interface 68 is provided via the operator interface device 18, then the CMCS fault information is formitted by the CMC control program output module in response to an ACARS data request command. For example, for many ACARS, it is preferable to format the data per the ARINC specification 724B. All of the data available through the MCDU is available to an operator through the ACARS interface. The data is transmitted to maintenance personnel via an ACARS prior to landing in order to make the ground maintenance procedure more efficient.

In order to provide aircraft system fault data analysis, the CMCS provides a maintenance message data base stored in the CMC memory and referred to during the continuous in flight analysis. A maintenance message is an English type message that describes a system, LRU, or component fault.

In the present invention, a data base of maintenance messages is established by creating a set of combinatory logic phrases of LRU states and operating parameters that describe the conditions for the possible LRU faults that might occur in an aircraft system. Each combinatory logic phrase is associated with a textural maintenance message that describes the fault. The maintenance messages are uniform in format and generally do not include codes or symbols.

With reference to FIG. 5, samples of several combinatory logic phrases used in the present invention along with related message numbers, maintenance messages, possible flight deck effects, ATA chapter numbers, and flight phases are illustrated. Each maintenance message is assigned a unique message number. The possible flight deck effect corresponds to the code numbers of flight deck effect(s) that might be reported simultaneously by the IDS if, in fact, the corresponding logic phrase becomes true. The correlation between the maintenance message and the FDE will be discussed below. Other information such as ATA chapter number, flight phase, etc., may be associated with each maintenance message. This information is then included in the various CMCS reports, and displays.

Each fault received by the CMC is assigned a mnemonic, e.g., "A76A010.23", by the CMC control program, that describes the fault, the source, etc. The combinatory logic phrases combined the faults with other operating parameters to determine the state of the maintenance message. The combinatory logic phrases include logic symbols AND "o", OR""+", EXCLUSIVE OR "*" and NOT, mnemonics which represent the specific faults reported, maintenance message numbers, and time factors. The maintenance message numbers are shorthand for their corresponding combinatory logic phrases and are incorporated into other logic phrases to reduce repetition of logic code. The "NOT." indication appears before an expression, i.e., message number, a mnemonic, or a combination thereof, to indicate that the logic phrase will be true if the expression creates a false state. The timers associated with time delay Booleans, for example, "2TD" in line 2, commence to increment when the function preceding the time delay is true, and the timers are cleared when the function becomes false. The time delays are preferably expressed in seconds and to the nearest second in the form nnTD. Other logic notations may be used in the logic phrases to indicate states, priorities, etc. For example, "PRE." before a mnemonic indicates the previous state of a Boolean is to be determined.

One line 1, the logic phrase is true if fault A76A010.23 or A76E010.23 is true and the message number 1503 is also true. If the logic is true, then message number 71039 is true. The maintenance message is now referred to as "active". The possible flight deck effect number, 73010700, corresponds to a flight deck effect generated by the IDS system and is further described by the maintenance message. The message text, ENG-1 TURB COOLING AIR VALVE/CONTROL VALVE/WIRING FAIL is the maintenance message that will be displayed by the CMCS to the operator.

The set of combinatory logic phrases is created by system design engineers utilizing aircraft system design information. A set of combinatory logic phrases may be created for specific LRUs or sets of LRUs. Once created, the logic is programmatically coded. Once process for creating the logic phrase code is to utilize a high level compiler to read the engineer generated phrases and to generate source code therefrom. The resulting source code may be in a language such as Ada. The source code is integrated into the CMC main program code and the entire CMC program is compiled. The result is a computer executable application program. Modifications to the logic portion of the program may be carried out by creating a new set of coded combinatory logic phrases and recompiling the main control program.

In one actual embodiment of the invention, a set of 6,500 maintenance messages is created and stored in the CMC memory as the maintenance message data base.

During operation, the CMC control program applies the combinatory logic phrases to the fault and operating data received by the CMC by continuously checking the truth of each logic phrase in the set. When a fault combination creates a true logic phrase, the corresponding maintenance message and related information, e.g., possible FDE numbers, ATA chapter, etc., are transferred to the fault history data base. In one actual method according to the present invention, the CMC control program cycles through the complete set of combinatory logic phrases once every second.

Once the combinatory logic code is created and integrated into the main control program, the main control program is loaded into the CMC memory 30. The onboard software loading procedure is carried out using a data loader compatible with the CMC. Because the control program exists in this form, updates to the program can be created and tested externally to the CMC and loaded when the updates are acceptable.

An airline data base may also be loaded in the CMC memory 30 prior to flight. The airline data base is an airline specific set of airline messages, referred to as NOTES, which each correspond to specific maintenance messages and/or FDEs. The NOTES provide specific airline part numbers, procedure indications, etc. Thus, each airline may customize the data base to provide the flight crew and maintenance personnel with additional maintenance information. When maintenance messages and/or FDEs are displayed during maintenance procedures, the corresponding NOTE is also made available. Other data bases such as HELP messages, EICAS messages, system configurations, shop faults, etc., may also be loaded in the CMC memory. These data bases are correlated with the maintenance messages, FDEs, or MCDU functions in a manner similar to that described above, e.g., by matching maintenance message numbers or some other suitable variables in the maintenance message data base. Each of the data bases is preferably loaded into the CMC independently of the CMC control program. In this manner, the data bases are modifiable without affecting the configuration of the CMC control program.

During operation, the CMCS is controlled by the CMC main control program. The CMC main control program includes program modules for controlling the collection of fault and operational data, consolidation of faults to produce active maintenance messages, the correlation of active maintenance messages to active FDEs, the display of maintenance messages and/or FDEs, the input monitoring process, and the execution of LRU tests. The collection of fault data and generation of active maintenance messages are done on a relatively continuous basis during flight. The processes of maintenance information display, input monitoring and test execution are generally executed in response to an operator request.

The data collection and active maintenance message generation performed by the CMCS is preferably continuously carried out in flight. There are no flight crew procedures requiring access to the CMCS. However, access to the CMCS may be automatically or manually inhibited through the CMC main control program if desirable. For example, access may be automatically inhibited when the aircraft is greater than 80 knots airspeed and less than 10,000 feet altitude. An optional inhibit that denies access any time the aircraft is in the air can be set by a flight crew member. Thus, except for the periods of inhibit that are programmed or set manually, the CMCS is continuously available to provide display of LRU fault data in flight. Even during periods of inhibit, the CMCs is continuously collecting LRU data.

Figure 6:
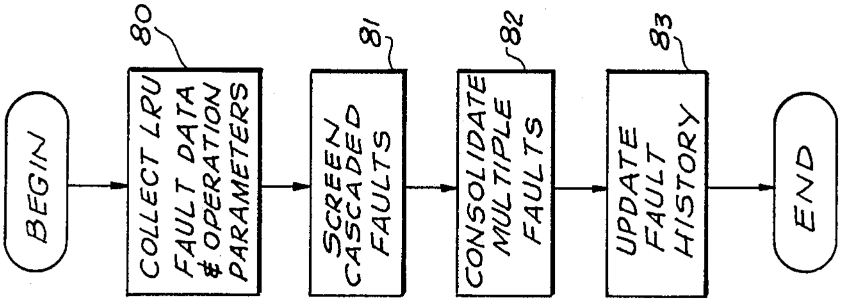
FIG. 6 is a flow diagram showing the fault consolidation procedure of the present invention.

With reference to FIG. 6, the creation of an active maintenance message from LRU fault data requires the collection of raw LRU fault data, the screening of cascaded LRU faults, and the consolidation of multiple LRU faults. This process is carried out in an ongoing cycle. Preferably, the cycle is completed once every second. The screening and consolidation procedures are both done by comparison of the combinatory logic code in the maintenance message data base to the fault and operating data collected. At step 80, the collection module in the CMC main control program causes the CMC input/output processor 28 to receive LRU fault data from the EIU 54 and the LRUs 48 via the indirect data bus and direct data bus, respectively. The data that is collected is referred to as raw data which includes digital, analog, and analog discrete data. Additionally, data indicative of operating parameters such as flight leg, time, etc., is collected or generated. The EIU converts all analog data to digital. Additionally, the collection module causes the analog discrete data received at the CMC to be converted to digital data.

Figure 7:
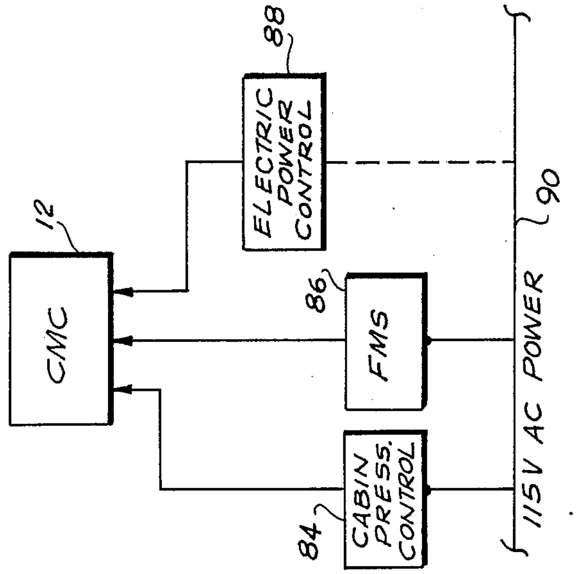
FIG. 7 is a block diagram of a portion of an aircraft system experiencing a cascading fault.

At step 81, the consolidation module of the control program screens cascaded faults. A cascaded fault is a fault resulting from an LRU failure that affects the operation of a number of associated LRUs. An example is the set of faults resulting from a power bus failure. With reference to FIG. 7, a series of LRUs and LRU control systems such as the cabin pressure control 84, the flight maintenance system (FMS) 86, and the electric power control 88, each sense a failure on the 115 volt AC power bus 90. Each of the LRUs and control systems appear to fail. Those failures are detected at the CMC 12. Each of these failures is a cascaded fault stemming from the failure of the 115 volt AC power bus. The consolidation module screens out the cascaded faults in order to isolate the specific power bus fault. Thus, although the CMC receives three separate fault indications, those indications are screened to produce a single power bus fault.

Figure 8:
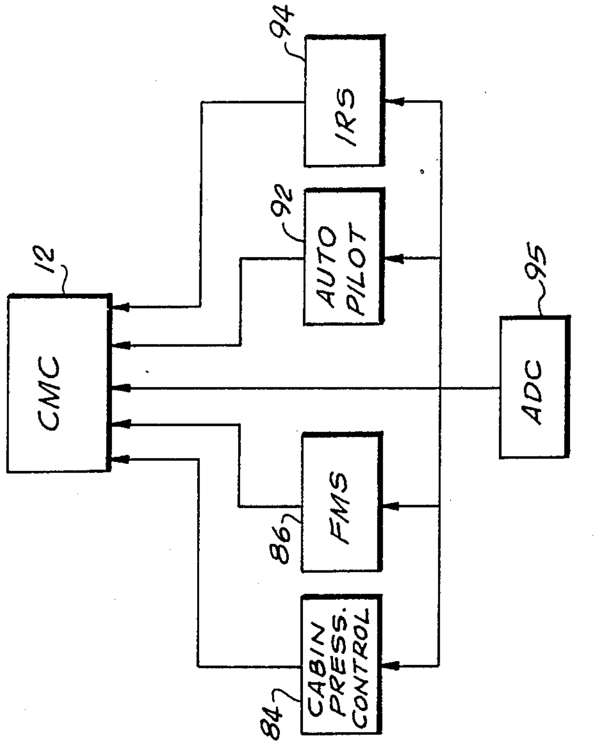
FIG. 8 is a block diagram of a portion of an aircraft system experiencing multiple fault reporting.

With reference again to FIG. 6, at step 82 multiple faults are consolidated by the consolidation module into a single isolated fault. With reference to FIG. 8, an example of a situation in which fault consolidation is required is illustrated. In the example, the cabin pressure control 84, flight maintenance system 86, autopilot 92, and inertial reference system (IRS) 92 each interface with the air data computer (ADC) 95. If the ADC fails, the cabin pressure control, the flight maintenance system, the autopilot, and the inertial reference system each reports an ADC interface fault. Additionally, the ADC fault is reported to the CMC. The consolidation module consolidates each of the faults into a single air data computer fault message. In each of the cases of screening cascaded faults and consolidating multiple faults, the consolidation module generally identifies a lower level fault, i.e., a fault that is closely identified with the actual fault source, than is reported to the flight crew or maintenance personnel by other means such as the observations and FDEs.

In order to screen the cascaded faults and to consolidate the multiple faults into a single fault, the consolidation module compares each combinatory logic phrase to the reported LRU states and operating parameters. If the state of the faults and other operating parameters, i.e., time delay, previous states, flight phase, etc., can be combined to match a coded logic phrase, then the maintenance message associated with the coded phrase is considered true and is set to "active". All other maintenance messages are set to "inactive", i.e., the associated logic phrase is not true for the analysis cycle. Additionally, messages may be set to "intermittent" depending upon criteria relating to the timing and occurence of active and inactive states. At step 83 in FIG. 6, the maintenance message and related information in the maintenance message data base that corresponds to the coded logic phrase are copied into the fault history data base.

In one preferred embodiment, the consolidation module acts to cause a maintenance message to be stored in the CMC nonvolatile memory (NVM) fault history data base immediately after the message becomes active. If such a data base is maintained, the consolidation module determines the priority of maintenance messages combined in the NVM. For example, the CMC is preferably capable of storing up to 500 maintenance messages in the NVM. As the number of fault messages increases in the NVM, the consolidation module determines which messages may be removed. Criteria for removal may include flight leg number, e.g., the flight leg number is used to indicate how "old" the message is, duplication of messages, and current capacity of the NVM. For example, the rule for adding a new maintenance message to the NVM may be: if the NVM is not full then the new maintenance message may be stored without any alteration to the data base; if the NVM is full and contains ten or more occurrences of the new maintenance message than the new message shall replace the oldest occurrence of that message; otherwise, the new maintenance message replaces the oldest message in the NVM. Preferably, if such a separate NVM fault history data base is maintained, the state of the maintenance messages in the data base are updated, e.g., set to active, inactive, or intermittent, during each analysis cycle.

In one preferred embodiment, an additional criteria for entering an active maintenance message into the fault history data base is the point in the flight that the message becomes active. An aircraft's continous use can be broken down into flight phases. For example, a complete flight phase may be defined as the period of time beginning and ending with the aircraft on the ground and either the first engine started, or the last door is closed and an engine is running. A flight phase is a set of flight modes that, together, account for the aircraft's complete flight and on-ground time. For a complete flight phase, the aircraft sequentially passes through the modes of: power on, pre-flight; engine start; taxi-out; takeoff; initial climb; climb; enroute cruise; descent; approach land; rollout; taxi-in; go around; and engine shutdown. Each of these methods is determined based upon operating parameters collected from the aircraft system. For each maintenance message record in the data base, a flight phase field is included. The field contains list of the flight modes during which the maintenance message, if it becomes active, is to be stored in the NVM. In this manner, the relevance of a maintenance message is screened by considering the point on the flight in which it is generated. Other flight modes, e.g., on-ground and in-flight, can be established and integrated into the maintenance message data base for use by the consolidation program.

In order to provide continuity with present maintenance procedures that report FDEs to maintenance personnel, the active maintenance messages are associated with active FDEs. As discussed above, FDEs are generated by the IDS, and represent combinations of the observations provided to the flight crew with the fault information received and processed by the IDS. The possible FDEs include: WARNING, CAUTION, ADVISORY, STATUS, MEMO, DISPLAY, PFD FLAG, and ND FLAG associated with an LRU or system. During the data collection and fault consolidation cycle, the CMCS additionally receives active FDE indications from the EIU and correlates those FDEs with active maintenance messages. This correlation is time dependent, i.e., the maintenance message and FDE must have a predetermined temporal relationship. With reference again to FIG. 5, each maintenance message in the maintenance message data base corresponds to a possible FDE. If, in fact, an active FDE number corresponds to a possible FDE number associated with an active maintenance message and the timing requirements for correction are met, then the message and FDE are considered to be correlated.

Figure 9:
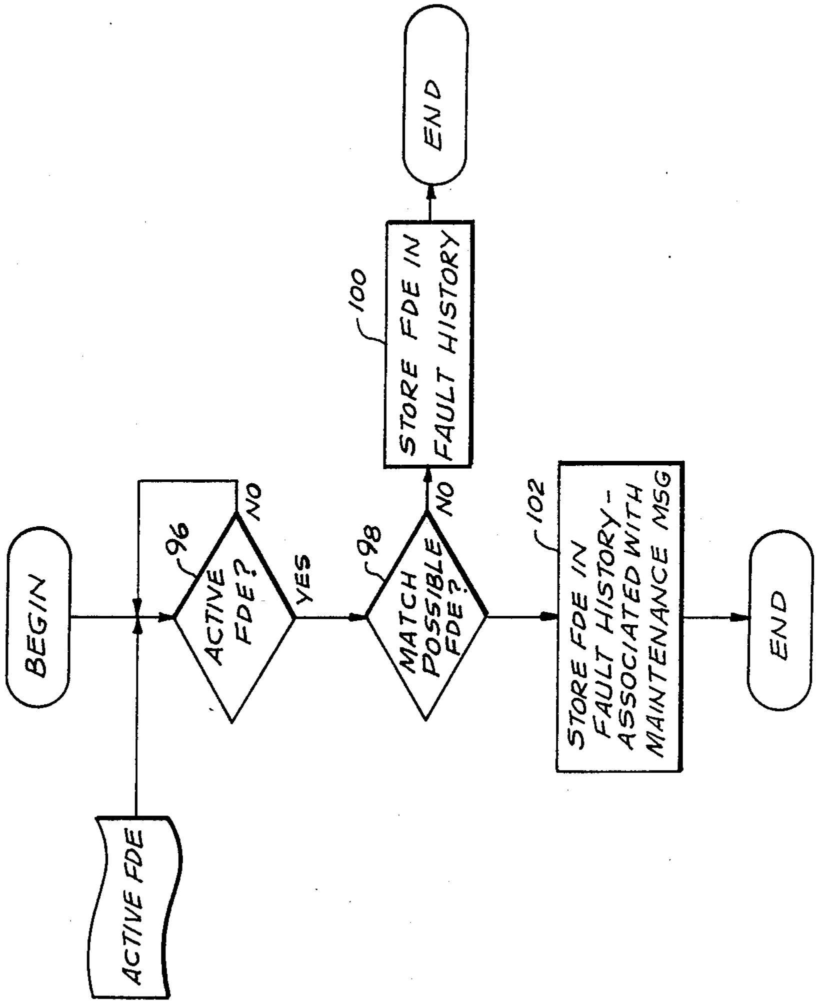
FIG. 9 is a flow diagram showing the FDE—maintenance message correlation procedure of the present invention.

With reference to FIG. 9, the maintenance message to FDE correlation procedure, controlled by a correlation module in the CMC main control program, begins at step 96 at which the CMC 12 receives an indication from the EIU 54 that an FDE has been set active by the IDS 36. This message is generated by the EIU in response to the creation of an EICAS message by the IDS. The EIU sends a bit on a word to the CMC over the indirect data bus 42 which indicates that the EICAS message has been created. This data transmittal is controlled by the collection module of the CMC main control program. At step 98, the possible FDE numbers related to the active maintenance messages which meet the timing requirements are scanned to determine whether the active FDE number corresponds to a possible FDE number. If no possible FDE number correlates to the active FDE, then at step 100 the FDE number is stored in the fault history data base for possible retrieval by the operator. At block 102, if the active FDE number correlates to a possible FDE number, then the FDE number is recorded in the fault history data base in association with the active maintenance message.

As with the maintenance messages, FDEs are preferably screened by the consolidation program according to the flight mode in which they are generated. For example, using the flight modes described above, the consolidation program may only correlate an FDE if it is generated in the flight mode of: take off; initial climb; climb; enroute cruise, descent, approach land; go around; or rollout. All other FDEs are not considered. In this manner, the CMC main control program does not store FDEs in the NVM fault history data base that are not considered necessary the the overall fault isolation procedure.

The step of correlating the active maintenance messages to active FDEs allows the maintenance message/FDE pairs in fault history to be displayed to the operator through the operator interface device. Currently, most aircraft maintenance procedures rely on, and begin their analysis from, the FDE by looking up the FDE number in a maintenance manual. Thus, the provision of the more detailed maintenance message correlated with the FDE number provides the operator with an advantage in the fault isolation procedure if not the sought after result. The maintenance message alone is meant to provide the operator with more detailed fault information than is available from the FDE number alone. Over time, the practice of relying on an FDE number as a start for manual maintenance procedures may be phased out and the FDE correlation unnecessary.

Figure 10:
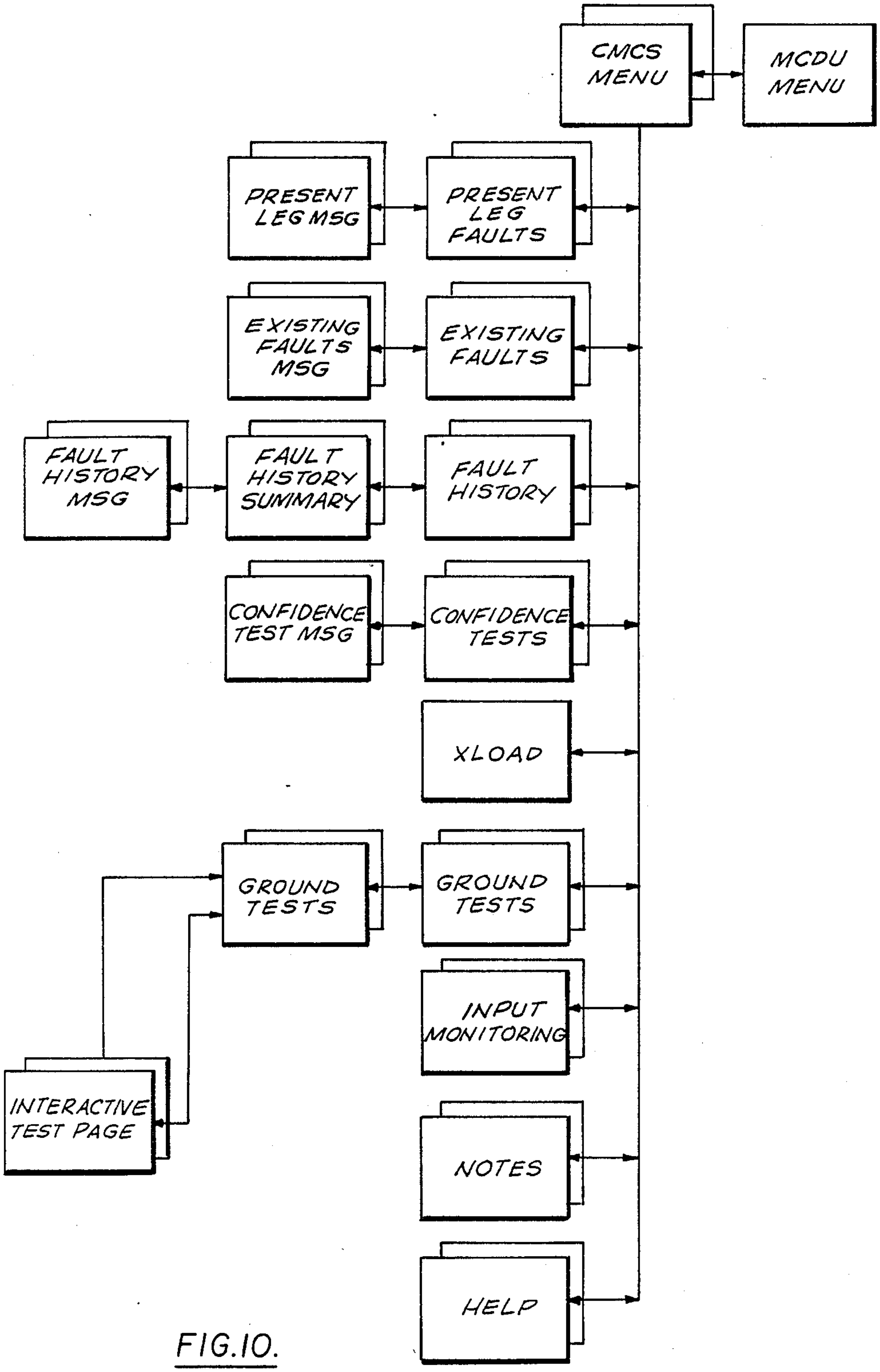
FIG. 10 is a block diagram of a central maintenance computer menu selection in accordance with the present invention; and, FIG. 11 is a flow diagram of a test procedure conducted in accordance with the present invention.
Figure 11:
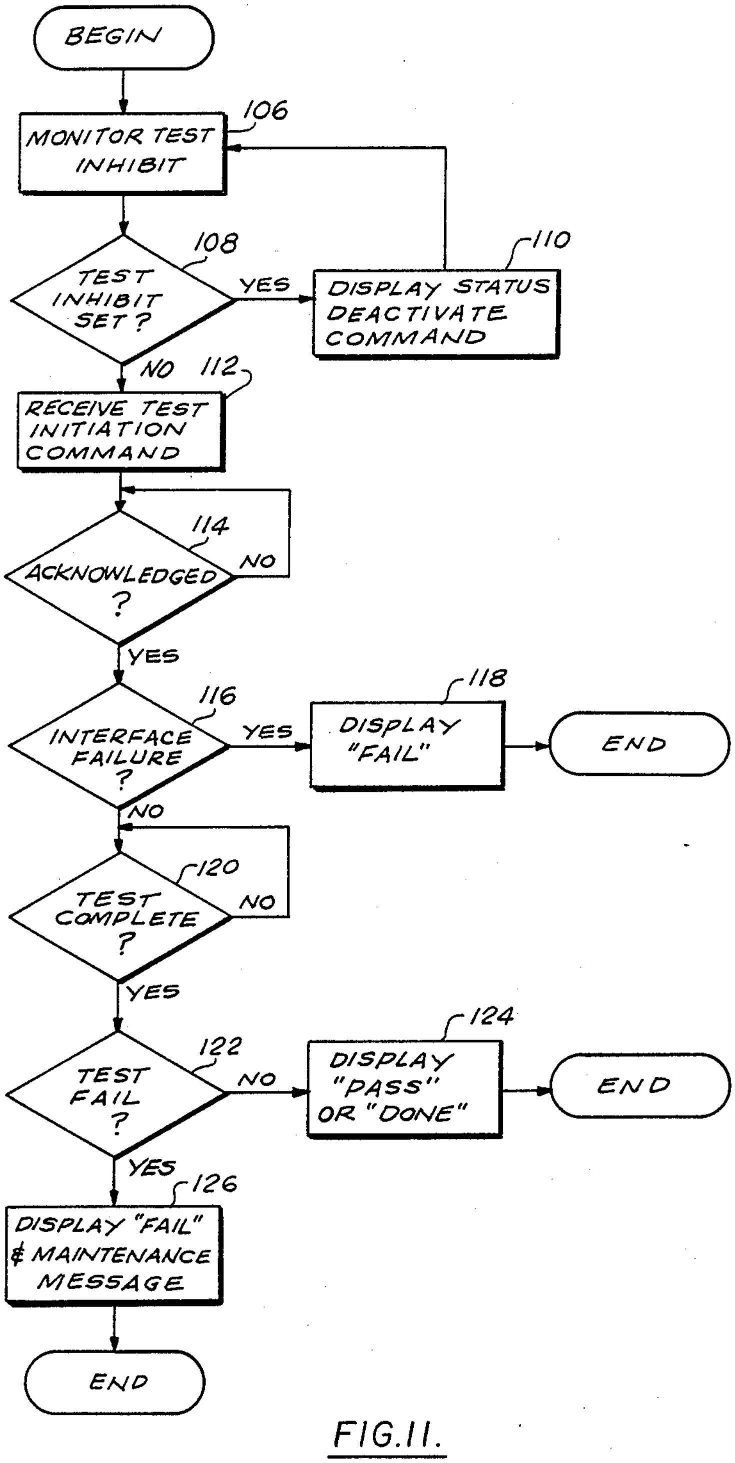

The active maintenance messages and/or FDEs from the fault history data base are presented to the operator via the operator interface device 18 in response to input display commands. With reference to FIG. 10, in a preferred embodiment, the functions provided by the CMCS include: present leg faults, existing faults and fault history, input monitoring, and confidence and ground tests. Optionally, a cross-loading function, and NOTES and HELP displays are provided.

Menus for each function are displayed on the screen 72 of the MCDU 70 when a selection is indicated through the depression of a line select key 76 adjacent the function display. The menus for present leg faults, existing faults and fault history all provide access to the fault history data base in the CMC memory. The input monitoring menu provides an interactive review of the status of a selected LRU. The confidence test and grounds test menus provide access to test initiation procedures. The cross-loading function is utilized to copy the fault history data base of one CMC to the other if two CMCs are being utilized and the CMCS cannot reconcile a disagreement between the respective fault histories.

The "present leg faults" menu provides the operator with access to a list of each flight deck effect reported to the CMCS by the IDS during the present flight leg. These are retrieved from the fault history data base by the output module of the CMC main control program and transmitted to the MCDU. The FDEs are listed in time order of occurrence beginning with the most recent. If a flight deck effect is correlated to a maintenance message, the maintenance message is displayed when the operator presses the line select key adjacent the screen indication.

In the "existing faults" menu, a list of the computerized control systems, preferably in ATA chapter order, that have active maintenance messages related thereto at the time the menu is called up or which become active during the review of the menu is provided. Selection of a specific system from the menu will result in a display of the active maintenance messages for that system.

In the "fault history" menu, a list of the systems that contain maintenance messages in the fault history data base are provided. The systems are listed in ATA chapter order. When a specific system is selected from the fault history menu, a fault history summary menu is provided for that system. The summary menu contains a list of the flight legs during which the CMC recorded an occurrence of each fault. When a specific fault is selected from the fault history summary menu, then the related fault history message page is displayed. The message page provides information regarding the fault which was selected. This menu displays active, inactive, and intermittent maintenance messages held in the fault history data base.

In each of the fault related displays, additional information such as ATA chapter number, flight phase, flight number, aircraft identification, departure/destination, etc., may be provided. This information may be collected by the CMC during flight and stored in the flight history data base or another data base in association with the maintenance messages. Additionally, a display may include a means for accessing airline NOTE and HELP information. If such a NOTE or HELP message is available for a displayed maintenance message, FDE, or function, then the availability will be indicated on the display screen.

The "input monitoring" function provides a means for interactively displaying the bit pattern of any LRU digital word being received by the CMC. The state of analog discretes coming to the EIU and CMC are packed into digital words, allowing the analog discrete information to also be accessible through the input monitoring function. Preferably, the display format for the digital word is chosen from binary, hexadecimal or predefined engineering units. The format is selected by the operator through the MCDU.

In order to select the LRU data to be displayed, the operator enters an identification for the particular word through the MCDU keyboard. The identification indicates to the CMC the source of the word relative to the input/output procesor. For example, if ARINC 429 protocol is used, an input/output port-octal label-source destination identifier (SDI) combination is an appropriate identifying input word. Using the identifying input word, the output module of the CMC main control program causes the input/output processors to transmit the most recent data from the identified source to the MCDU. The identifying input word is displayed along the bottom of the display screen. The bit pattern of the word is displayed in the top of the screen. Preferably, multiple display lines are provided and are updated sequentially starting with the upper field and refreshing the screen downwardly to the bottom field. The display update cycle preferably corresponds with the general data selection cycle described above. "Freeze" and "resume" commands are also displayed. The display is frozen by selecting the line select key adjacent the "freeze" command selection. The interactive display process is resumed by selecting the line select key adjacent the "resume" command.

LRU tests are initiated and controlled through the CMCS. LRU tests include confidence tests, ground tests, interactive BITE test and ATE tests. The CMC control program includes a test module for controlling the various test procedures. In certain instances, the test module causes the CMCS to format the test initiation commands received by the input/output processors from the operator interface device in a specific format. In other circumstances, the CMCS acts as a pass-through means allowing relatively free access to the LRUs connected to the CMCS via the test initiation bus. In the latter cases, the test module causes the CMC to pass test initiation commands through to the LRUs.

With reference again to FIG. 10, the confidence test and ground test menus are accessed through the CMCS main menu. The "confidence test" menu lists the available confidence tests. If a test is run and a FAIL message is displayed by the MCDU, then a confidence test results page related to the test is accessed by selecting the line select key adjacent the FAIL message. In response, a display of the maintenance message(s) related to the FAIL test condition is provided.

The "ground test" menu lists the ATA chapter and name of computerized control systems with BITE tests available. The ground test menu allows a ground test to be selected. If a test is executed and a FAIL message is displayed on the MCDU, then a ground test results page related to the test is accessed by selecting the line select key adjacent the FAIL message. A display of the maintenance message(s) relating to the FAIL test condition are displayed. An interactive BITE test is similar to a ground test but requires operator interaction, i.e., to formulate test initiation commands, etc. In response to a request to execute an interactive test, the test module causes the related interactive test page, i.e., screen display, to be presented to the operator. The operator is then guided through the test initiation procedure by the display inputs.

During a test procedure the CMCS generally continues the data collection and consolidation cycles described above. The fault data received by the CMC during the test period, i.e., the period from test initiation to test completion, will include information generated by the LRU of interest in response to the test. Therefore, once an indication of test completion is received by the CMC, the test module generates the test results by analyzing the relevant active maintenance messages, causes the results to be displayed, and makes any related maintenance message(s) available for display.

With reference to FIG. 1, during BITE testing function of the CMCS, the CMC 12 at step 106 continuously monitors the BITE test inhibit bit sent from the BITE 40. If the inhibit bit is set at step 108, the CMC 12 causes that status to be displayed and the corresponding line select key 76 of the MCDU 70 related to the command to be deactivated at step 110. When the test is available through the BITE at step 108, it may be initiated at step 112. The test is initiated by an operator command received from the MCDU. The identification of the BITE along with the identification of the specific test are written into a test initiation word and transmitted to the BITE by the CMC via the test initiation bus 46. The BITE is then expected to respond immediately by acknowledging the request and/or indicating it has transitioned into a functional test status at step 114. At step 116, if an interface failure, i.e., LRU to CMC communications failure, is received by the CMC, i.e., through the CMC BITE, a test FAIL message is transmitted to and displayed by the MCDU at step 118.

If, at step 114, the BITE signals to the CMC that the test has been initiated and, at step 116, no interface failures occur, the test module awaits a test compute indication at step 120. After the BITE transitions back to a normal nonfunctional test status, the test module processes the tests results. At step 122, the maintenance messages activated during the testing period are analyzed in order to determine whether any of those maintenance messages are related to the LRU under test and the specific test procedure. The analysis preferably includes the step of comparing the relevant active maintenance messages to a set of "normal results" related to the test procedure. The "normal results" set includes the maintenance messages that are to be evaluated to determine the PASS/FAIL status of a test. If a maintenance message included in the "normal results" list was activated during the test period, then the test is considered to have failed and a FAIL message is transmitted to the MCDU for display. At step 126, the maintenance message causing the FAIL state is available for display by the operator interface device. Otherwise, a PASS or DONE message is transmitted to the MCDU at step 124.

To the operator, the test results are indicated by displaying PASS, or FAIL or DONE on the display screen. If FAIL is displayed, then the selection of the line select key adjacent the FAIL message will display the maintenance message(s) which explain the reason(s) for test failure.

For a test initiated by an analog discrete signal rather than a digital command summary word, the general procedure is similar. However, rather than sending test initiation commands to BITE, the CMC holds the analog discrete test signal to the LRU under test at a low state until the system indicates that the request is acknowledged.

For interactive test initiation, the procedure described above is followed until the point at which the system changes its status to functional test. At that point, the system under test additionally outputs a word that identifies a particular predefined screen within a CMC test screen data base that corresponds to the test. Upon receipt of the word the CMC displays the identified screen and the operator inputs command from that screen.

Certain LRU test procedures do not follow these basic test initiation steps. As noted above, this is one of the difficulties in performing a central maintenance function. The exceptions, however, are easily provided in an exceptions menu. The CMC main control program provides test modules for each test procedure exception. Thus, a test selected through the exceptions menu will cause the execution of a related test module. The fact that the test procedure is exceptional is preferably transparent to the operator.

Preferably, the CMCS is also capable of interfacing with automated test equipment (ATE). A connector 59 is installed on the front panel of the CMC 12 to connect with ATE 51. Two high-speed ARINC 429 buses run from the CMC to ATE and one high-speed ARINC 429 bus runs to the CMC from ATE. Through the CMC, ATE access any digital word (including spares), any analog discrete word or variable input (including spares) connected to either the EIU 54 or the CMC 12. The ATE preferably formats its own test initiation commands, and obtains the test results by accessing the data being received at the CMC input/output processor port that contains the data of interest.

While preferred embodiments of the invention have been illustrated and described, it should be understood that variations will be apparent to those skilled in the art. Accordingly, the invention is not to be limited to the specific embodiments illustrated and described. Certin modifications to the described embodiments can be made within the scope and spirit of the invention. For example, the CMCS functions may be integrated into existing onboard aircraft systems having adequate space, processing capabilities, and interfaces.

Additionally, the CMCS may collect fault and operation data from other control systems besides the IDS. In the same manner, the maintenance messages may be correlated to maintenance information generated by the aircraft system besides FDEs. In order to do so, a correlation key for each data base must be established in a manner similar to the FDE number in the maintenance message data base.

The CMCS may also include expert systems capabilities in the main control program or expert system equipment connectors at the CMC. An expert system for fault isolation could function in conjunction with the combinatory logic fault consolidation program or could be substituted therefor.

Finally, while the functions of the CMC main control program are described in terms of modules, it is to be understood that the actual program structures does not affect the scope or operation of the present invention. Additionally, various data base structures are suitable for use in the present invention. For example, the maintenance message data base may function as the fault history data base by the addition of active FDE entries and flags for indicating "active", "inactive", and "intermittent" maintenance message status.

The embodiments of the invention in which an exclusive property or privilege is claimed are defined as follows:

1. An onboard central maintenance computer system for an aircraft system, the aircraft system including: (a) a plurality of LRUs; (b) communication means through which the LRUs can transmit LRU fault data and receive test initiation commands; and (c) an operator interface device including (i) presentation means for presenting maintenance information generated by the central maintenance computer system, (ii) input means for receiving input commands, and (iii) interface communication means for transmitting the input commands and receiving the maintenance information, the central maintenance computer system comprising:

(a) data transfer means for transferring data within said central maintenance computer system;

(b) input/output means coupled to the data transfer means, and coupled to the communication means and to the interface communication means for receiving and transmitting data therebetween;

(c) memory means coupled to said data transfer means for storing data including a plurality of preestablished maintenance messages; and, (d) control processing means coupled to said data transfer means for controlling the transfer and processing of data within said central maintenance computer system and for controlling the operations of said input/output means and said memory means, said control processing means including:

a collection module for causing said input/output means to collect the LRU fault data via the communication means; and a consolidation module for generating an active maintenance message from the LRU fault data by screening out cascaded faults and consolidating multiple faults to produce an isolated fault, associating said isolated fault with one of said maintenance messages, termed active maintenance message, in said memory means, and causing said active maintenance message to be identified in said memory means.

2. A central maintenance computer system in accordance with claim 1, wherein the communication means further includes an LRU control system for monitoring and testing controlled LRUs, and for generating controlled LRU fault data, and a fault collection device coupled to the LRU control system for receiving the controlled LRU fault data, and wherein said collection module includes an indirect module for controlling the communication means such that controlled LRU fault data is transmitted from the fault collection device to said input/output means and a direct module for controlling the communication means such that LRU fault data is transmitted directly from noncontrolled LRUs, which are not monitored or tested by said LRU control system, to said input/output means.

3. A central maintenance computer system, in according with claim 2, wherein said central maintenance computer system further includes a data selection module in the fault collection device for selecting which controlled LRU fault data is received by the fault collection device.

4. A central maintenance computer system in accordance with claim 1, further comprising an output module for causing, in response to an input command indicative display request received by said input/output means, said active maintenance message to be transmitted as maintenance information from the memory means to the interface communication means, whereby said maintenance message is presented by the operator interface device for analysis.

5. A central maintenance computer system in accordance with claim 4, wherein:

the fault collection device further includes flight deck effect means for generating a flight deck effect indicative of an LRU fault in response to the LRU fault data;

said indirect module further causes the flight deck effect to be transmitted from the fault collection device to said input/output means;

said control processor means further includes a correlation module for correlating the flight deck effect with one of said active maintenance messages, and for causing said correlated flight deck effect to be stored in said memory means in association with said active maintenance message; and said output module further causes the correlated flight deck effect and maintenance message to be transmitted to the interface communication means as the maintenance information.

6. A central maintenance computer system in accordance with claim 5, wherein each of said preestablished maintenance messages is stored in said memory means in association with possible flight deck effect data, and wherein said correlation module, in order to correlate the flight deck effect received from the fault collection device with an active maintenance message, attempts to correlate the flight deck effect so received to said possible flight deck effect data associated with each of said active maintenance messages.

7. A central maintenance computer system in accordance with claim 4, wherein said output module, in response to an input command indicative of an input monitoring request received via said input/output means, causes the collected LRU fault data for the specified LRU to be formatted in a predetermined display format, and to be transmitted via said input/output means to the interface communication means as the maintenance information, whereby the LRU status can be interactively monitored via the operator interface device.

8. A central maintenance computer system in accordance with claim 4, wherein said memory means includes an airline data base including airline messages, and said output module includes means for associating an airline message with an active maintenance message in said memory means, and for causing the associate airline message to be transmitted via said input/output means to the interface communication means in conjunction with said active maintenance message.

9. A central maintenance computer system in accordance with claim 4, wherein the operator interface device includes an ACARS interface for transmitting and receiving digital data between the aircraft system and the ground, and wherein said output module, in response to an input command indicative of an ACARS output request received via the input/output means, causes said active maintenance message to be formatted in ACARS format and causes said formatted maintenance message to be transmitted to the interface communication means via said input/output means, whereby the maintenance message is transmitted via the operator interface device to the ground for operator analysis.

10. A central maintenance computer system in accordance with claim 1, wherein said control processing means further includes a test module for (i) causing, in response to an input command indicative of an LRU test initiation request received via said input/output means, a test initiation request to be transmitted to the LRU specified in the command, (ii) in response to a test complete signal generated by the LRU, determining the test results, and (iii) causing the test results to be transmitted to the interface communication means as the maintenance information, whereby the central maintenance computer system acts as a test interface device between the operator and the LRU.

11. A central maintenance computer system in accordance with claim 10, wherein said memory means includes a test result data base of LRU fail conditions, a fail condition being true if the LRU condition occurs during the testing period, and wherein said test module, in order to determine said test results, determines whether any of the fail conditions match an active maintenance message generated by the consolidation module during the testing period, and, if there is a match, causes a fail message to be transmitted to the interface communication means, and, upon receipt of an input command indicative of a test result display command, causes the matched active maintenance message to be transmitted to the interface communicaton means, whereby said maintenance message provides the operator with an explanation of the test results.

12. A central maintenance computer system in accordance with claim 1, wherein each of said preestablished maintenance messages is stored in said memory in association with a combinatory logic phrase including operating parameters such as LRU states, flight legs and time delays, and logical connectors, wherein the aircraft system generates data indicative of the operating parameters, wherein said collection module causes said input/output means to collect data indicative of the operating parameters, and wherein said consolidation module matches the LRU fault data and operating parameters with the combinatory logic phrases in said memory means and, if a combinatory logic phrase is matched, the associated maintenance message, termed active maintenance message, is identifying in said memory means.

13. A central maintenance computer system in accordance with claim 1, wherein said input/output means includes an automated test equipment (ATE) connector for coupling ATE to said central maintenance computer system, and transmitting the correlated flight deck effect along with said active maintenance message to the interface communication means as the maintenance information.

14. A method for centralized fault handling in an aircraft system, the aircraft system including: (a) a plurality of LRUs; (b) communication means through which the LRUs can transmit LRU fault data and receive test initiation commands; (c) an operator interface device including (i) presentation means for presenting maintenance information generated by the central maintenance computer system, (ii) input means for receiving input commands, and (iii) interface communication means for transmitting the input commands and receiving the maintenancee information; and (d) a central maintenance computer system including: (i) input/output means for receiving and transmitting data between the central maintenance computer system and other aircraft system components; (ii) memory means for storing data including a plurality of preestablished maintenance messages; (iii) control processing means for controlling the transfer and processing of data within said central maintenance computer system and for controlling the operations of said input/output means and said memory means, said method comprising:

(a) collecting a complete set of LRU fault data at the input/output means via the communication means; and (b) generating, in response to the LRU fault data and the preestablished maintenance messages, an active maintenance message by screening out cascaded faults and consolidating multiple faults to produce an isolated fault, associating said isolated fault with one of the preestablished maintenance messages, termed active maintenance message, and causing said active maintenance message to be identified in said memory means.

15. The method for centralized fault handling in accordance with claim 14, further comprising the step of transmitting the active maintenance message as maintenance information from the memory means to the interface communication means, whereby said maintenance message is presented by the operator interface device for analysis.

16. The method of centralized fault handling in accordance with claim 15, wherein a component in the aircraft system generates a flight deck effect indicative of an LRU fault, and wherein the step of collecting a complete set of LRU fault data includes the step of collecting the flight deck effect, and the fault handling method further includes the steps of:

correlating the flight deck effect with one of said active maintenance messages;

storing said correlated flight deck effect in said memory means in association with said active maintenance message; and wherein said control processing means further includes a test module for causing, in response to an input command indicative of an ATE LRU test initiation request received via said input/output means, a test initiation request to be transmitted to the LRU, and, in response to a test complete signal generated by the LRU, determining the test results and causing the test results to be transmitted to the ATE via said input/output means, whereby the central maintenance computer system acts as an ATE interface between the operator and the LRU.

17. The method for centralized fault handling in accordance with claim 16, wherein: each of said preestablished maintenance messages is stored in association with a flight mode; a preestablished flight deck effect data base is stored in said memory means, said data base including flight deck effects in association with flight modes; the aircraft system generates data indicative of operating parameters such as flight mode; and wherein said step of collecting said LRU fault data includes the step of collecting said fight modes;

said step of generating an active maintenance message includes the step of determining whether said flight mode corresponds to the maintenance message in the maintenance message data base, and causing said maintenance message to be stored in said memory means as an active maintenance messagee if said flight mode corresponds thereto;

said step of collecting the flight deck effect includes the step of determining whether said flight mode corresponds to the flight deck effect in the flight mode data base; and said step of correlating the flight deck effect is carried out if the flight mode corresponds to the flight deck effect.

18. The method for centralized fault handling in accordance with claim 14, wherein each of said preestablished maintenance messages is stored in said memory means in association with a combinatory logic phrase, wherein the aircraft system generates data indicative of the operating parameters, wherein:

said step of collecting complete LRU fault data includes collecting the data indicative of the operating parameters;

said step of generating an active maintenance message includes the step of matching the collected LRU fault data andd operating parameters with the combinatory logic phrases in said memory means and, if a combinatory logic phrase is matched, identifying the associated maintenance message, termed active maintenance message, in the memory means.

* * * * *

UNITED STATES PATENT AND TRADEMARK OFFICE
CERTIFICATE OF CORRECTION

PATENT NO. : 4,943,919

DATED : July 24, 1990

INVENTOR(S) : Aslin et al.

It is certified that error appears in the above-identified patent and that said Letters Patent is hereby corrected as shown below:

| Column | Line | |
|---|---|---|
| [57] | 12 | Delete "receiver" and insert therefor --receive-- |
| 2 | 7 | Delete "monitore" and insert therefor --monitored-- |
| 4 | 11 | Delete "notations, It" and insert therefor --notations, it-- |
| 8 | 63 | Delete "CMS" and insert therefor --CMCs-- |
| 9 | 16 | Delete "test initiation" and insert therefor --"test initiation"-- |
| 9 | 18 | Delete ""test initiation"" and insert therefor --test initiation-- |
| 13 | 62 | Delete "textural" and insert therefor --textual-- |
| 14 | 16 | Delete "combined" and insert therefor --combine-- |
| 14 | 19 | Delete "OR"" and insert therefor --OR-- |
| 15 | 20 | Delete "in" and insert therefor --into-- |
| 15 | 37 | Delete "variables" and insert therefor --variable-- |
| 16 | 3 | Delete "CMCs" and insert therefor --CMCS-- |
| 17 | 19, 20 | Delete "combined" and insert therefor --contained-- |
| 17 | 55 | Delete "methods" and insert therefor --modes-- |
| 17 | 62 | Delete "on" and insert therefor --in-- |
| 18 | 20 | Delete "correction" and insert therefor --correlation-- |
| 20 | 41 | Delete "test" and insert therefor --tests-- |
| 22 | 15 | Delete "command" and insert therefor --commands-- |
| 22 | 28 | Delete "59" and insert therefor --50-- |
| 22 | 44, 45 | Delete "Certin" and insert therefor --Certain-- |
| 22 | 66 | Delete "structures" and insert therefor --structure-- |
| 23 | 63, 64 | Delete "according" and insert therefor --accordance-- |
| 24 | 4 | After "indicative" insert --of a-- |
| 25 | 31 | Delete "communicaton" and insert therefor --communication-- |

UNITED STATES PATENT AND TRADEMARK OFFICE
CERTIFICATE OF CORRECTION

PATENT NO. : 4,943,919

DATED : July 24, 1990

INVENTOR(S) : Aslin et al.

It is certified that error appears in the above-identified patent and that said Letters Patent is hereby corrected as shown below:

| Column | Line | |
|---|---|---|
| 25 | 54 | After "and" delete the remainder of the claim and insert therefor --wherein said control processing means further includes a test module for causing, in response to an input command indicative of an ATE LRU test initiation request received via said input/output means, a test initiation request to be transmitted to the LRU, and, in response to a test complete signal generated by the LRU, determining the test results and causing the test results to be transmitted to the ATE via said input/output means, whereby the central maintenance computer system acts as an ATE interface between the operator and the LRU.-- |
| 26 | 39 | After "maintenance" delete the remainder of the claim and insert therefor --messages; and transmitting the correlated flight deck effect along with said active maintenance message to the interface communication means as the maintenance information.-- |

Signed and Sealed this

Twenty-seventh Day of August, 1991

*Attest:*

HARRY F. MANBECK, JR.

*Attesting Officer*

*Commissioner of Patents and Trademarks*